United States Patent [19]

Reiji et al.

[11] 4,419,118

[45] Dec. 6, 1983

[54] QUARTZ GLASS AND A PROCESS FOR MAKING SAME

[75] Inventors: Oguma Reiji, Hatano; Hirai Akihiro, Odawara, both of Japan

[73] Assignee: Toshiba Ceramics Co., Ltd., Tokyo, Japan

[21] Appl. No.: 331,901

[22] Filed: Dec. 18, 1981

[30] Foreign Application Priority Data

Dec. 23, 1980 [JP] Japan .................................. 55-181294

[51] Int. Cl.³ .............................................. C03C 3/24
[52] U.S. Cl. ....................................... 65/18.2; 65/18.1; 65/18.4
[58] Field of Search ...................... 65/18.1, 18.2, 18.3, 65/32, 18.4

[56] References Cited

U.S. PATENT DOCUMENTS 1,003,271  9/1911  Kent ...................................... 65/18.1
3,994,708 11/1976  Reth et al. .............................. 65/32

FOREIGN PATENT DOCUMENTS 1287541  2/1962  France ..................................... 65/32

*Primary Examiner*—Arthur D. Kellogg

[57] ABSTRACT

Quartz glass includes iron and aluminum. The total iron content ranges from 0.01 to 5% by weight, and the total aluminum content ranges from 0.01 to 10% by weight. The quartz glass exhibits infrared rays-absorbing ability and visible light-transmitting ability. Also a process for making such a quartz glass is disclosed.

19 Claims, 3 Drawing Figures

QUARTZ GLASS AND A PROCESS FOR MAKING SAME

BACKGROUND OF THE INVENTION

This invention relates to an infrared ray-absorbing quartz glass which can be used under high temperatures, and also to a process for making the same. The glass of this invention is well adapted to the use, for example, as bulb glass.

Conventional infrared ray-absorbing glasses include phosphate glass and ordinary silicate glass containing $Fe^{++}$.

Those known glasses, however, are defective in the following points.

The infrared-absorbing glasses produced by incorporating iron into phosphate glass, soda-lime glass, borate glass, lead glass, aluminosilicate glass and the like, invariably exhibit poor heat resistance and chemical stability. Particularly when they are used under high temperatures over a prolonged period, their light transmittance is impaired. Furthermore, due to their poor heat resistance, they cannot be used in the vicinity of heat-generating sources such as light source. Consequently, the devices using said glasses must have large sizes, and hence the infrared-absorbing glasses employed in such devices must serve as large size filters.

In the process for making an infrared-absorbing glass by impregnating a high silica, porous glass obtained from borosilicate glass, with an iron salt and sintering the same, the produced glass unavoidably contains boron which drastically reduces the heat resistance of quartz glass. Thus the product would withstand the temperatures of, at the most, around 800° C., exhibiting heat resistance below that of quartz glass. Also the process must be skillfully and precisely controlled for satisfactory dehydration of the iron salt penetrating into the fine voids in the porous vitreous body and decomposition of said salt into oxide. If the sintering is effected before the impregnated system is sufficiently dried, voids are apt to be formed or the vitreous body broken, rendering the process quite impractical.

OBJECT OF THE INVENTION

Accordingly, an object of the present invention is to provide a quartz glass which is free from the various defects in the conventional techniques as above-described, which has excellent heat resistance and infrared ray-absorbing ability and which is light-transmittable within the visible wave-length region, as well as to provide a process for making such a quartz glass.

DESCRIPTION OF EMBODIMENTS

To purified rock crystal powder which had been pulverized and refined, a solution containing iron and aluminum compounds is adhered, followed by drying and heating. The heated mixture is thereafter fed into a furnace having an oxygen-containing atmosphere, to be fused. The atmosphere covers an oxygen gas-containing atmosphere. Whereupon various vitreous bodies which are transparent to varying extents are obtained, in various colors such as blue, brown and black.

Figure 1:
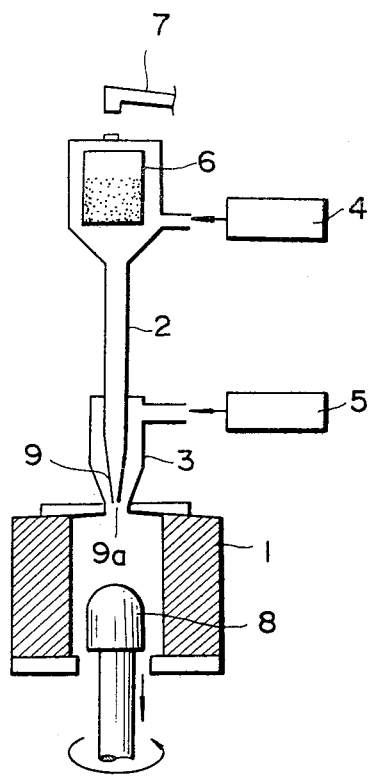
FIG. 1 is a generalized schematic view showing one example of a quartz glass-making apparatus useful for practicing the process of this invention.

FIG. 1 shows an example of a quartz glass-making device suited to practice of a flame fusion method. Into the furnace 1, an oxygen gas-supplying source 4 and a hydrogen gas-supplying source 5 are connected through pipes 2 and 3, respectively. A tank 6 containing the starting material is also connected to the furnace 1 through the pipe 2. In FIG. 1, 7 denotes a hammer. A rock crystal or quartz powder blended with iron oxide and aluminum oxide is fed from tank 6 together with the oxygen gas from the tank 4 into the furnace 1 through the opening 9a of a burner 9. The fed blend is fused as it passes through flame of the burner 9 in the furnace 1, and converted into a quartz glass ingot 8.

Figure 2:
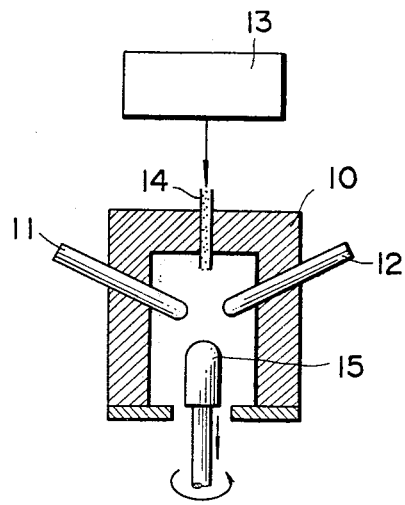
FIG. 2 is also a generalized schematic view showing another quartz glass-making apparatus.

FIG. 2 shows another device for making the infrared-absorbing quartz glass of this invention without using a flame, in which an arc discharge is formed between the electrodes 11 and 12 inserted into the furnace 10. The number of the electrodes is not limited to 2, i.e., the number may be 3 or more. The silica powder blended with iron and aluminum compounds is fed through the pipe 14, from the material feeding device 13 into the furnace 10, and fused by the heat generated by the arc discharge between the electrodes 11 and 12 for conversion into an infrared ray-absorbing quartz glass ingot 15.

Preferably, the oxygen-containing atmosphere in the furnace 10 contains air, oxygen, carbon dioxide, carbon monoxide and steam. Those components may be contained as parts of other components. In any case, the atmosphere must contain oxygen. Otherwise $Fe^{++}$ ions therein become unstable, and the produced glass is apt to have defective transparency or light transmittance.

The vitreous body obtained as above is heated, if required, in a hydrogen-containing atmosphere (hydrogen treatment), at 500~1200° C., and thereby converted into a somewhat light, bluish vitreous body exhibiting excellent light transmittability.

Figure 3:
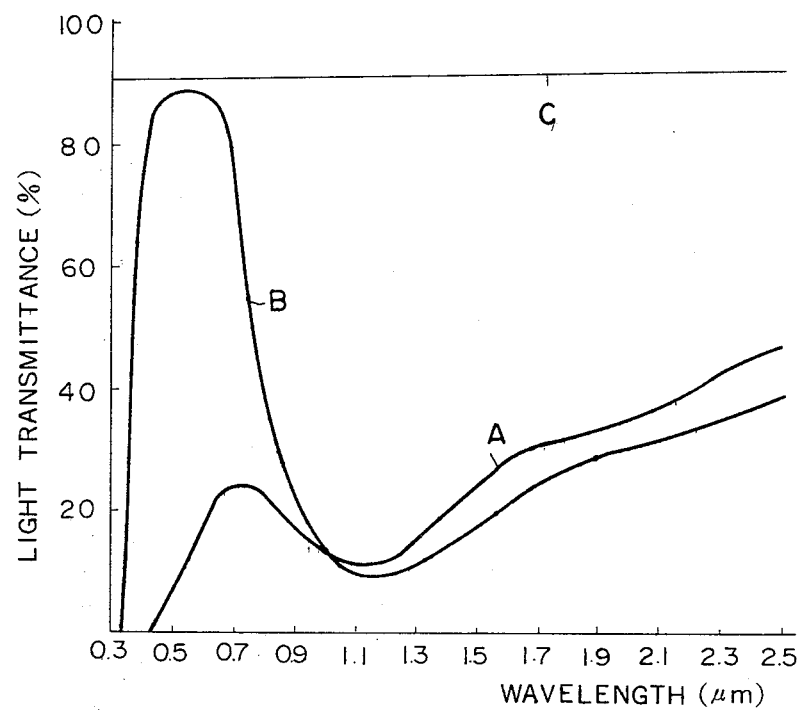
FIG. 3 is a graph comparing a quartz glass of this invention with a conventional glass, by way of an example, as to their photo-absorption spectra.

FIG. 3 shows, by way of an example, a spectral transmittance curve A of a brown vitreous body before the hydrogen treatment and a spectral transmittance curve B of the same vitreous body after the above-mentioned hydrogen treatment, measured with a spectrophotometer.

In FIG. 3, the light absorption spectrum of the infrared-absorbing quartz glass of this invention is compared with that of a known glass.

In FIG. 3, A shows the spectrum of the glass fused in an oxygen-hydrogen flame, which is a brown glass produced in an atmosphere of relatively high oxygen concentration, from a starting mixture in which the Al/Fe ratio is low. Also, B shows the spectrum of a slightly light, bluish glass which is obtained by heat-treating the above brown glass in nitrogen-gas containing 10% hydrogen, at about 1000° C. It can be seen that a glass of B shows excellent transmittance of visible light within the wavelength region of 0.4 to 0.7 μm, but strongly absorbs infrared rays of wavelengths longer than 0.8 μm. Incidentally, when the fusion of the starting mixture with a high aluminum content is effected under relatively low oxygen concentration, for example, in an atmosphere wherein the oxygen/hydrogen ratio is much lower than ½, by the method illustrated in FIG. 1, thus rendering the flame hydrogen-excessive, a light blue glass having the spectrum analogous to that of the glass of B can be obtained without the hydrogen treatment.

In FIG. 3, C shows the absorption spectrum of an ordinary transparent quartz glass to which no iron or aluminum has been added.

Thus, the vitreous body of A before the hydrogen treatment, which has been obtained by the addition of iron and aluminum, shows its peak of absorption in the infrared region around 1.1 μm, and a minor absorbing ability, in the visible wavelength region of 0.4–0.7 μm. The A sample was brown. Quartz sample B, obtained by treating the body of A with hydrogen, the infrared absorption in the wavelength region longer than 1 μm remained substantially unchanged, but the absorption of visible light of 0.4–0.7 μm substantially disappeared. Thus transmission characteristics of B became equivalent to that of the ordinary transparent quartz glass.

The quartz glass containing iron and aluminum, which have been prepared by the above-described oxygen-hydrogen flame fusion method (a most widely practiced fusion method of producing transparent quartz glass), have delicately varied colors from blue to brown of different shades, the darkest being black, depending on such factors as the fusing conditions (furnace construction, fusing temperature, quantitative oxygen/hydrogen ratio in the atmosphere, fusion rate, etc.), grain size of the refined quartz powder, amounts of the iron and aluminum added and, and the like. Also their spectral transmittance curves vary, from that showing no light transmittance over substantially the entire wavelength region of ultraviolet-visible light-infrared, to that which permits transmittance of visible light but is opaque in the infrared region of wavelengths longer than 1 μm, e.g., the hydrogen-treated vitreous body B, as shown in FIG. 3. Those quartzes which are opaque in the visible wavelength region, however, can be made substantially transparent to the visible light having wavelengths of 0.4–0.7 μm, while retaining absorption in the infrared region, by the hydrogen treatment as above-described. The hydrogen treatment, therefore, is desirable for producing a quartz glass having infrared-absorbing ability and visible light transmittance with high efficiency, although it is not essential depending on the fusing conditions employed.

Incidentally, when the rock crystal starting material, admixed with an iron compound, alone but no aluminum compound is fused in the apparatus shown in FIG. 1 or FIG. 2, many hours are required to obtain a vitreous body. Furthermore, the vitreous bodies obtained are brown-colored in different shades, the darkest being black, and fail to become clear transparent bodies even after the hydrogen treatment. Their absorption in the infrared region also is lower than that of a vitreous body containing the identical amount of iron and, additionally, some aluminum. If the iron content is low, for example less than 0.01%, a transparent vitreous body can be obtained in the absence of aluminum, but such a product becomes brown when heated over a prolonged period in air, with its visible light transmittance reduced and its infrared absorption degraded. Thus it is not suitable for prolonged use under high temperature conditions.

Whereas, addition of aluminum alone, i.e., with the absence of iron in the starting mixture, has no effect on the photo-absorption of quartz glass in the visible light to infrared region. Presumably the aluminum in the quartz glass functions to stabilize the infrared absorbing ability of $Fe^{++}$, by its concurrent presence with iron.

If the iron content of the quartz glass is less then 0.01%, the glass thickness must be at least 10 mm to effectively shield infrared rays. Thus such a low iron content is not proper for realizing stable visible light transmittance and infrared absorption under high temperatures. (When the Fe content was 0.01%, a 10 mm-thick quartz glass showed a light transmittance of 5% at 1.1 μm.) If the iron content is more than 50%, the product shows inferior light transmitting characteristics. Furthermore, it become difficult to make homogeneous vitreous bodies. In practice, it is preferred that the starting mixture should contain 0.01~10% by weight of aluminum, in order to obtain a homogeneous mixture of rock crystal powder with iron and aluminum, with the concentration variation dependent on the fusing conditions. An aluminum content of no less than 0.01% by weight is sufficient to dilute the high iron-concentration spots with aluminum, so that a stably visible light-transmittable, infrared-absorbing quartz glass which is usable in high temperatures may be obtained. If the aluminum content exceeds 10% by weight, however, it is impossible to secure stable characteristics required for a heat-resistant quartz glass. Thus too high an aluminum content is impractical.

The hydrogen treatment is normally effected at the temperatures ranging from 500° to 1200° C. The time required for the product to beome visible light-transmittable varies depending on the thickness of the glass to be treated. With a 3 mm-thick vitreous body, it is normally around 24 hours.

When a homogeneous mixture of iron oxide, aluminum oxide and quartz powder is fused in a furnace in an atmosphere under no partial pressure of oxygen, for example, by the vacuum fusion method, a black vitreous body is obtained. Such a vitreous body cannot be converted to the product of this invention (a vitreous body exhibiting excellent visible light transmittance and infrared-absorbing ability), by the hydrogen treatment or by any other means.

Having the above-described characteristics the invention provides the following advantages.

(1) The vitreous quartz glass product exhibits excellent heat resistance, allowing its use in high temperature areas near heat-generating sources, infrared-absorbing ability and visible light transmittance.

(2) The product enables the reduction in size and weight of various heat shielding type photo-generating devices or fluoroscopic devices.

(3) In the form of a vitreous body to be used under high temperatures, such as a bulb glass, the product of this invention with infrared absorption capability effectively avoids thermal problems caused by the heat radiation from the lamp.

The upper limit of the temperature at which the glass can be satisfactorily used is dependent on to the strain point of the glass. Normally when the glass is used under the temperatures below the strain point, it can be used with stability over a long term without any deformation. Conventional infrared-absorbing phosphate glass has a strain point around 500° C. but no higher. Also that of the iron-containing Vycor glass presumably is not higher than 900° C., as inferred from its composition. In contrast thereto, the strain point of the infrared-absorbing quartz glass according to this invention is no lower than 1000° C., and in certain cases can be almost equal to 1070° C., which is the strain point of a transparent quartz glass. The product of this invention also exhibits excellent chemical durability, substantially equivalent to that of transparent quartz glass. For this reason the infrared-absorbing quartz glass of this invention can be used if it is in direct contact with light sources, as inner tubes of mercury lamps or bulb glass.

The advantages of the invention are seen to a remarkable degree when a tube or long plate is formed by drawing directly through a nozzle placed at the bottom of a furnace in which the fused glass is produced by fusing the above-described mixture. In this case, it is preferable that the nozzle be made of a metal such as molybdenum or tungsten and that the tube or plate be formed within an atmosphere of hydrogen or of an inert gas containing hydrogen, which atmosphere serves to protect the metal.

What is claimed is:

1. A process for producing an infrared ray-absorbing and visible light-transmitting quartz glass comprising the steps of:
    forming an admixture consisting essentially of silicon oxide or a precursor thereof, iron oxide or a precursor thereof and aluminum oxide or a precursor thereof in relative amounts providing a total iron content of 0.01 to 5% by weight and a total aluminum content of 0.01 to 10% by weight in the final product; and
    melting said admixture in an oxygen-containing atmosphere in a furnace to produce said quartz glass having infrared ray-absorbing and visible light-transmitting properties.

2. The process of claim 1 further comprising the step of shaping said quartz glass melt wherein said quartz glass melt is solidified to produce an ingot.

3. The process of claim 1, further comprising the step of heating the quartz glass in a hydrogen-containing atmosphere at a temperature between 500° C. to 1200° C.

4. The process of claim 1, wherein the admixture is formed by adhering a solution containing iron and aluminum compounds to purified rock crystal powder, prior to the melting step.

5. The process of claim 1, wherein the silicon oxide is silica powder or quartz powder.

6. The process of claim 1, wherein the mixture is heated by arc discharging means in a furnace.

7. The process of claim 1, wherein the mixture is heated by a burner flame in a furnace.

8. The process of claim 1, wherein the oxygen-containing atmosphere in the furnace contains air, oxygen, carbon dioxide, carbon monoxide and steam, or other compounds containing them.

9. The process of claim 1, wherein the oxygen-containing atmosphere in the furnace contain air, oxygen, carbon dioxide, carbon monoxide and steam, or other compounds containing them.

10. A process for producing an infrared absorbing and visible light-transmitting quartz glass shaped product, comprising the steps of:
    (a) forming an admixture consisting essentially of silicon oxide or a precursor thereof, iron oxide or a precursor thereof and aluminum oxide or a precursor thereof in relative amounts providing a total iron content of 0.01 to 5% by weight and a total aluminum content of 0.01 to 10% by weight in the final product;
    (b) melting said admixture in an oxygen-containing atmosphere in a furnace to produce said quartz glass having infrared ray-absorbing and visible light-transmitting properties;
    (c) shaping the quartz glass melt; and
    (d) heating the quartz glass shape in a hydrogen containing atmosphere.

11. The process of claim 10 wherein the quartz glass melt is shaped into a sheet, bar or tube.

12. The process of claim 10 wherein the shaped quartz glass is heated in the hydrogen-containing atmosphere at a temperature between 500° C. and 1200° C.

13. The process of claim 10, wherein the mixture is made by adhering a solution containing an iron and aluminum compounds to purified rock crystal powder prior to the melting step.

14. The process of claim 10, wherein the silicon oxide is silica powder or quartz powder.

15. The process of claim 10, wherein the mixture is heated by arc discharging means in the furnace.

16. The process of claim 10, wherein the mixture is heated by the flame from a burner in the furnace.

17. A process of making a quartz glass shape, comprising the steps of:
    (a) forming an admixture consisting essentially of silicon oxide or a precursor thereof, iron oxide or a precursor thereof, and aluminum oxide or a precursor of thereof;
    (b) melting the admixture in a oxygen-containing atmosphere to produce a quartz glass mass; and
    (c) shaping the quartz glass mass.

18. The process of claim 17, further comprising the step of:
    (d) heating the quartz glass shape in a hydrogen-containing atmosphere.

19. The process of claim 18, wherein the quartz shape is heated at a temperature of 500° C. to 1200° C.

* * * * *